(12) United States Patent
Siemensen

(10) Patent No.: US 11,415,487 B2
(45) Date of Patent: Aug. 16, 2022

(54) COLLECTION DEVICE AND METHOD FOR COLLECTING DISSECTED OR ABLATED SPECIMENS AND MICROSCOPE HAVING SUCH A DEVICE

(71) Applicant: LEICA MICROSYSTEMS CMS GMBH, Wetzlar (DE)

(72) Inventor: Christian Siemensen, Mainz (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 191 days.

(21) Appl. No.: 16/646,591

(22) PCT Filed: Sep. 14, 2018

(86) PCT No.: PCT/EP2018/074896
§ 371 (c)(1),
(2) Date: Mar. 12, 2020

(87) PCT Pub. No.: WO2019/053195
PCT Pub. Date: Mar. 21, 2019

(65) Prior Publication Data
US 2020/0284696 A1 Sep. 10, 2020

(30) Foreign Application Priority Data
Sep. 14, 2017 (DE) .............. 10 2017 121 326.0

(51) Int. Cl.
| G01N 1/00 | (2006.01) |
| G01N 1/04 | (2006.01) |
| B01L 3/00 | (2006.01) |
| G01N 1/28 | (2006.01) |

(52) U.S. Cl.
CPC ............. *G01N 1/04* (2013.01); *B01L 3/508* (2013.01); *G01N 1/28* (2013.01); *B01L 2400/0424* (2013.01); *G01N 2001/284* (2013.01); *G01N 2001/2886* (2013.01)

(58) Field of Classification Search
None
See application file for complete search history.

(56) References Cited

U.S. PATENT DOCUMENTS

| 4,956,065 A | 9/1990 | Kaler |
| 7,704,363 B2 | 4/2010 | Bryning et al. |
| 8,021,532 B2 | 9/2011 | Hunt et al. |

(Continued)

FOREIGN PATENT DOCUMENTS

| DE | 19804800 A1 | 8/1999 |
| DE | 01035091 A1 * | 1/2003 |

(Continued)

*Primary Examiner* — Jyoti Nagpaul
(74) *Attorney, Agent, or Firm* — Leydig, Voit & Mayer, Ltd.

(57) ABSTRACT

A collection device for collecting a sample dissected or ablated from an object includes a collection container configured to collect the dissected or ablated sample. An electrode pair is arranged on a side of a base of the collection container facing away from the object or on or in the base itself. The electrodes of the electrode pair are arranged concentrically. A voltage supply is configured to apply a voltage to the electrodes of the electrode pair such that a divergent electric field is generated at least in a region of the collection container.

18 Claims, 3 Drawing Sheets

(56) References Cited

U.S. PATENT DOCUMENTS

| | | |
|---|---|---|
| 2003/0133190 A1 | 7/2003 | Weiss |
| 2011/0083961 A1 | 4/2011 | Mueller et al. |
| 2015/0300983 A1 | 10/2015 | Urey et al. |
| 2016/0370315 A1 | 12/2016 | Schlaudraff |

FOREIGN PATENT DOCUMENTS

| | | |
|---|---|---|
| DE | 10135091 A1 | 1/2003 |
| DE | 10018253 C2 | 8/2003 |
| DE | 10322348 B4 | 5/2005 |
| DE | 102006033889 A1 | 9/2007 |
| DE | 102013212811 A1 | 1/2015 |
| EP | 1276586 B1 | 8/2005 |
| EP | 2912453 A1 | 9/2015 |
| WO | WO 2003/008934 A1 | 1/2003 |

\* cited by examiner

COLLECTION DEVICE AND METHOD FOR COLLECTING DISSECTED OR ABLATED SPECIMENS AND MICROSCOPE HAVING SUCH A DEVICE

CROSS-REFERENCE TO PRIOR APPLICATIONS

This application is a U.S. National Phase Application under 35 U.S.C. § 371 of International Application No. PCT/EP2018/074896, filed on Sep. 14, 2018, and claims benefit to German Patent Application No. DE 10 2017 121 326.0, filed on Sep. 14, 2017. The International Application was published in German on Mar. 21, 2019 as WO 2019/053195 under PCT Article 21(2).

FIELD

The present invention relates to a collection device and a method for collecting dissected or ablated samples and a laser microscope system having such a device. The invention is thus in the field of laser microdissection and other methods for ablation or dissection of samples from an object. The imaging and studying of such objects before and/or during and/or after the dissection and/or ablation of a sample is generally carried out using a microscope.

BACKGROUND

The term "laser microscope system" is to be understood in the present case as a laser microdissection system or a laser ablation system, but also other systems which use an upright or an inverse microscope in conjunction with a laser beam generated by a laser for dissection or ablation of a sample from an object.

Methods for processing biological samples by laser microdissection have already existed since the middle of the 1970s and have been continuously refined since then. In laser microdissection, cells, tissue regions, etc. can be isolated from a biological sample ("object") and obtained as so-called dissectates. One particular advantage of laser microdissection is the brief contact of the sample with the laser beam, by which it is hardly changed. The dissectates can be obtained in different ways.

For example, in known methods a dissectate, which falls into a suitable dissectate collection container under the influence of gravity, can be isolated from a sample by means of an ultraviolet laser beam by a section line created using the laser beam. The dissectate can also be cut out of the sample in this case together with a membrane adhering to the sample. In contrast, in so-called "laser capture microdissection," a thermoplastic membrane is heated by means of a corresponding infrared laser beam. In this case, the membrane fuses with the desired region of the sample and can be removed by tearing in a following step. A further alternative is to adhere the dissectate by means of the laser beam to a cover of a dissectate collection container. In known inverse microscope systems for laser microdissection, dissectates transported upward by means of a transport pulse can also be adhered to the bottom of a dissectate collection container, which is provided with an adhesive coating.

Known microscope systems for laser microdissection comprise an incident light unit, into the beam path of which a laser beam is coupled. The laser beam is focused by the respective microscope objective used onto the sample, which rests on a microscope table movable by a motor. A section line can be created in that the microscope table is moved during the cutting in order to move the sample in relation to the fixed laser beam. However, this has the disadvantage, inter alia, that the sample cannot be readily observed during the creation of the section line, since the sample moves in the field of vision and the image appears fuzzy and/or blurry without further compensation measures.

Therefore, laser microdissection systems are more advantageous which comprise laser deflecting units and/or laser scanning units, which are configured to move the laser beam and/or its point of incidence on the fixed sample to be dissected. Such laser microdissection systems, which are also supposed to be used in the scope of the present invention and offer special advantages therein, are explained in detail hereafter. One particularly advantageous laser microscope system, which comprises a laser deflecting unit having glass wedges adjustable in relation to one another in the laser beam path, is described, for example, in EP 1 276 586 B1.

In both cases, i.e., in systems having moving or fixed sample, pulsed lasers are generally used, wherein a hole or a depression is created in the sample by each laser pulse. A section line results due to a juxtaposition of such holes or depressions, possibly with overlap.

Laser microdissection can be used to obtain single cells, cell compartments, or defined tissue regions having, for example, a diameter of approximately 500 µm. With suitable actuation, the laser beam can also cut out significantly larger regions, which are only bounded by the size of the slide on which the sample to be cut is arranged.

However, the dissectates generally only have a size in the micrometer range, for example, around 20 µm or less, which are separated using a laser beam from the surrounding tissue and are subsequently subjected, for example, to different diagnostic analysis methods. In oncology, laser microdissection can be used, for example, to isolate specific (tumor) cells from a microscopic section and to study them for specific metabolites, RNA expression level, DNA mutations, or proteins.

In the above-mentioned laser microdissection system according to EP 1 276 586 B1, a scanning unit is used to displace the laser beam focus perpendicularly to the optical axis in the object plane. This scanning unit operates using two optical wedges (prisms, glass wedge plates), the surfaces of which are inclined in relation to the optical axis (wedge angle) and which are mounted to be rotatable around the optical axis. By rotating the optical wedges in relation to one another, a beam deflection of the laser beam is generated, so that the laser beam focus can be displaced in a defined manner in the object plane to dissect a sample located therein. Reference is expressly made to cited European patent specification EP 1 276 586 B1 with respect to structure and functionality of this scanning unit. In practice, corresponding systems are distinguished by an upright base stand having fixed objective revolver not movable in the z direction (perpendicular to the object plane), wherein the microscope table is moved in said z direction for focus setting. During the dissection, the microscope table is fixed in the x and y directions (i.e., in the object plane).

Other laser microdissection systems are generally based on inverse microscopes and make use of a fixed laser beam (without scanning unit), so that the sample is cut by means of movement of the microscope table in the x and y directions. The focus setting is performed in such systems by moving the objective revolver in the z direction, the microscope table itself generally cannot be moved in the z direction.

A device for the contact-free transfer of dissectates obtained by membrane-supported laser microdissection is known from DE 103 22 348 B4. Under the presumption that the cutting out process electrostatically charges the cut-out dissectate, the transfer into a receptacle vessel can be assisted electrostatically. For this purpose, two linearly arranged electrodes are arranged below the object and charged in opposition to charge the electrostatically charged dissectate. A further electrode, which can assist the cutting out process by being charged with the same sign as the sample and/or the dissectate, is located above the object. The resulting Coulomb forces pull the dissectate in the direction of the electrode below the receptacle vessel. The method described therein has the disadvantage that one is dependent on the sample, i.e., the dissectate, always electrostatically charging due to the cutting out process. This is not controllable depending on the environmental conditions (ambient humidity, for example, in the incubator, composition of the samples (damp or dry samples, salt content of the samples, etc.)). With electrically neutral samples, the electrostatic principle cannot unfold its effect reproducibly or is linked to a large technical expenditure. In the described method, a second electrode similar to a control grating in a tube, which is upstream from the electrode below the collection vessel, ensures a prior acceleration of the charged sample or the dissectate. Depending on the charge of the sample and voltage of the intermediate electrode, this can have the result that the sample remains adhering in the region of this electrode and thus can no longer be found. The control process for the voltages at the three electrodes and the mechanical structure thus become very complicated and correspondingly costly.

A device for the automated recovery of dissected membrane-supported samples and the transfer thereof into a downstream collection vessel is known from DE 198 04 800 C2. For this purpose, an electrical or magnetic field is generated in the region of the collection vessel, which attracts the electrically charged microdissectate or the magnetized microdissectate, respectively. An electrically charged or magnetized sample or membrane is also the presumption here, so that the above-described disadvantages exist for neutral samples.

SUMMARY

In an embodiment, the present invention provides a collection device for collecting a sample dissected or ablated from an object. The collection device includes a collection container configured to collect the dissected or ablated sample. An electrode pair is arranged on a side of a base of the collection container facing away from the object or on or in the base itself. The electrodes of the electrode pair are arranged concentrically. A voltage supply is configured to apply a voltage to the electrodes of the electrode pair such that a divergent electric field is generated at least in a region of the collection container.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
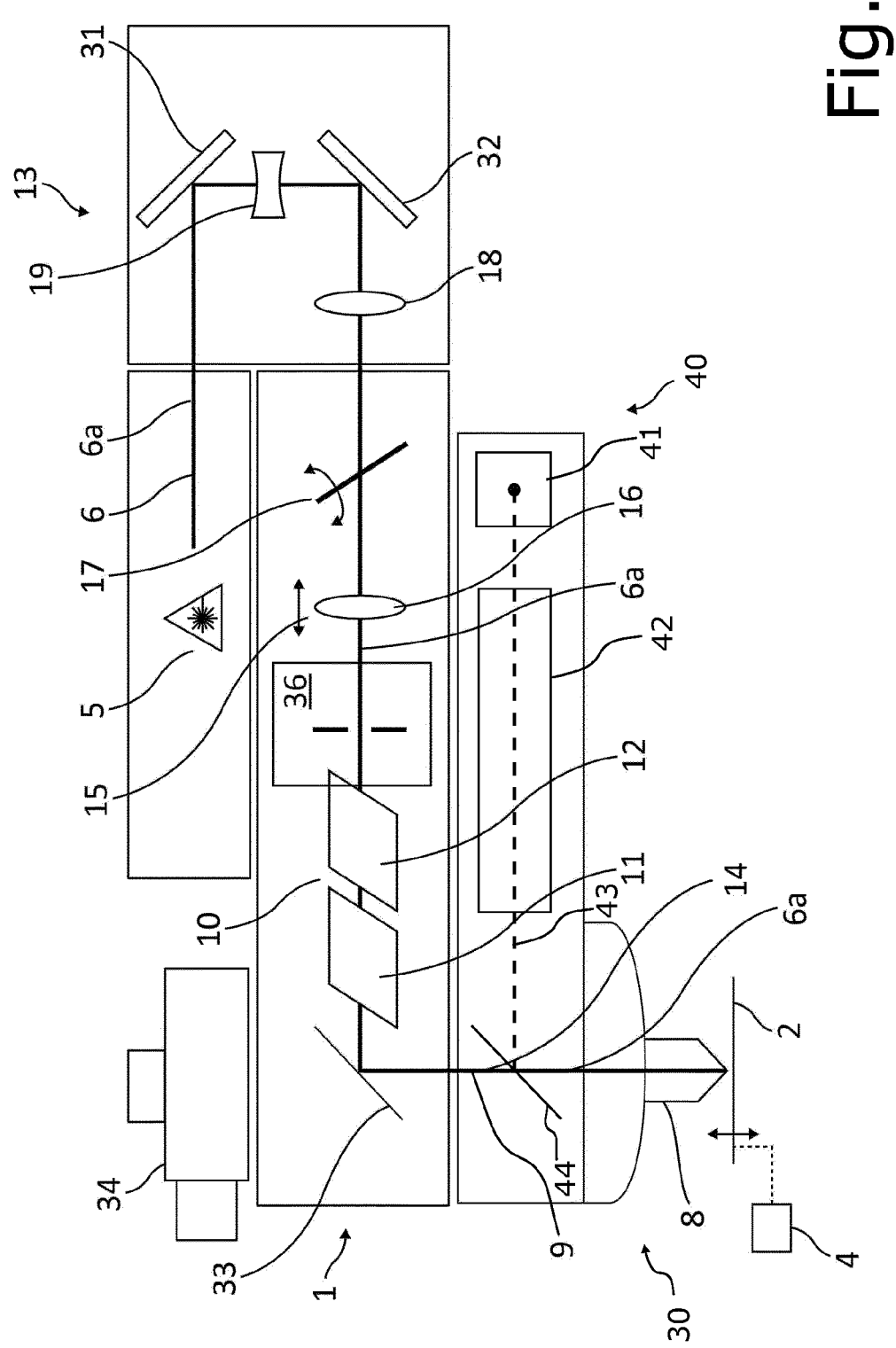
FIG. 1 schematically shows the structure of a laser microscope system in the form of a laser microdissection device without a collection device, FIG. 2 schematically shows the structure of a collection device according to one embodiment of the present invention together with a detail of the laser microscope system according to FIG. 1, and FIG. 3 schematically shows one possible embodiment of a concentric electrode pair in a top view.

In the case of laser dissection or ablation of samples, the cut-out samples fall into a collection container or are transferred therein. The cut-out samples can subsequently be identified in the collection container by means of a microscope having an objective of lesser enlargement. It frequently occurs in this case that the cut-out samples have to be searched for, whereby the cycle time of experiments lengthens enormously. The sample and/or the collection container can also be electrostatically charged, whereby the risk exists that the cut-out sample can no longer be found, since it adheres on the edge of the collection container or on the object holder above the collection container.

Embodiments of the present invention provide to avoid the above-mentioned disadvantages during the dissection or ablation of samples and in particular provide the option of transferring neutral and in particular also electrostatically charged samples reliably into a collection vessel and in particular into a predefined region of a collection vessel.

To achieve the above-mentioned advantages, embodiments of the present invention provide a collection device for collecting samples dissected or ablated from an object, a laser microscope system, and a corresponding method.

A collection device according to an embodiment of the invention for collecting dissected or ablated samples comprises at least one collection container for collecting the samples, wherein this collection container usually comprises an opening oriented toward the object, through which the dissected or ablated samples pass. Furthermore, at least one electrode pair is arranged on the side of the base of the collection container facing away from the object and thus the opening of the collection container or also directly on or in the base of the collection container. If the sample falls due to gravity into the collection container after dissection or ablation, the electrode pair is thus located, for example, below the base of the collection container. The collection device furthermore comprises at least one voltage supply for applying a voltage to the electrodes of the electrode pair, wherein a concentrically arranged electrode pair is provided and wherein the voltage applied to the electrode pair generates a divergent electric field at least in the region of the collection container.

In the following, in particular the case of the dissection of samples is to be considered for simpler explanation of an embodiment of the invention, without restriction of the generality, wherein the sample is transferred into the collection container without applied voltage at the electrode pair under the influence of the force of gravitation. The other cases of the ablation of a sample and the sample transfer against gravity are not to be explained in greater detail for the sake of simplicity, without a restriction of the invention being linked thereto.

A very inhomogeneous electric field can be generated by suitable geometry of the electrode pair. This induces a dipole moment in the sample, which is typically dielectric. A force acts on the dipole, which moves the sample into regions of higher field divergence. This force is dependent on the induced dipole moment and the divergence of the electric field. Very divergent fields typically exert a higher force on the dipole and thus on the sample than weakly divergent fields. This physical effect, known as dielectrophoresis, is used in the present case according to an embodiment of the invention for collecting dissected or ablated samples in a collection container. A strongly divergent electric field can be generated in the region of the collection container, i.e., inside the collection container and in the region of its surroundings up to the location of the dissection or ablation, using an electrode pair below the collection container or in or on the base of the collection container via the application of a high voltage. Since the dissected or ablated samples are usually dielectric, a force acts thereon which is oriented in the direction of the highest field divergence. The position at which the dissected or ablated samples collect can thus be determined in dependence on the profile of the electric field.

According to an embodiment of the invention, a concentrically arranged electrode pair having an inner and an outer electrode is used. It is advantageous in this case if the outer electrode is in turn concentric in relation to the circumference of the collection container, because the samples are thus collected in the middle of the collection container. It is in turn advantageous in this case if the outer electrode has essentially the same dimensions as the circumference of the collection container, in particular the circumference of the base of the collection container, and the inner electrode is arranged in the region of the center axis of the collection container, i.e., for example, in the region of the base center of the collection container. The samples then collect around the central inner electrode. For example, an inner electrode of smaller cross section or an electrode formed as an electrode tip can be used. A ring-shaped electrode can be used as the outer electrode, wherein the electrode can also comprise one or more ring segments or circular segments. A ring-shaped outer electrode has proven to be particularly advantageous, which extends concentrically in relation to the circumference of the base of the collection container and concentrically encloses an inner electrode tip. In order that the electric field can propagate in the interior of the collection container and as far as possible to the location of the dissection or ablation, the collection container itself cannot be electrically conductive. "Ring-shaped" is also understood as an electrode which is embodied as a plate having circular opening or as a ring disk. The electrode pair can consist, for example, of a printed strip conductor, for example, in the form of a film, which can in turn be arranged below or on the base of the collection container.

The principle of dielectrophoresis has heretofore been used in particular to capture biological particles. A method is known from U.S. Pat. No. 4,956,065, to cause a neutral particle such as a biological cell to float freely in an electric field generated by means of a special electrode configuration, to be able to microscopically study and image this particle.

A set of tweezers formed from a special electrode configuration for capturing molecules by means of dielectrophoresis is known from U.S. Pat. No. 8,021,532 B2.

Furthermore, a device is known from U.S. Pat. No. 7,704,363 B2, by means of which a polar substance which has a dipole moment, such as a nucleic acid, protein, carbohydrate, cell, etc., and which is transported along a path, is captured and collected in a concentration zone, which is formed by an electric alternating field extending perpendicularly to the transport path of the polar substance.

The dissected or ablated samples advantageously collect at the base of the collection container around the inner central electrode. The user can thus find the cut-out samples faster. In the case of electrostatic charge, for example, of the samples or the collection container, the samples nonetheless reliably arrive in the interior of the collection container, without already remaining adhering on the object holder or on the edge of the collection container. This gives the user a substantial time advantage in the analysis of his samples and, in particular in the case of laser ablation, in which the sample size rarely exceeds a few micrometers, gives him the certainty of also actually having captured the samples.

In addition to the dielectric force because of the divergent electric field, the force of gravitation acts on the sample, which can be several orders of magnitude greater than the dielectric force depending on the field divergence. Actually, the sample therefore may hardly be deflected above all in the case of greater distances between object and base of the collection container. However, the small particle size of the samples in the range of a few micrometers has the effect that the sample is decelerated within a few milliseconds by the Stokes friction in the air or in the surrounding gas, respectively, and falls downward at a constant speed of a few millimeters per second. The force of friction therefore completely compensates for the force of gravitation, whereby the resulting force is the dielectric force. The sample thus falls in the direction of the highest field divergence.

A high field divergence can be achieved by special arrangements of electrodes. One advantageous geometry comprises a concentric electrode pair, in particular having a grounded outer electrode, in the center of which an electrode tip is located, which is in particular at a high voltage potential, in particular between 100 V and 10 kV.

It is advantageous if the voltage supply applies AC voltage to the electrode pair or, in the case of grounding of the outer electrode, to the central electrode. In this manner, the dielectric force can act on the particles completely independently of the surface charge thereof, which results upon electrostatic charge, since the electrostatic force averages away over time, but the dielectric force is independent of the polarity of the field.

In a further advantageous design, the voltage supply is in turn controlled or regulated by means of a control unit, specifically with respect to the voltage amplitude and/or with respect to the voltage time curve. The control unit is in particular suitable, inter alia, for the purpose of registering malfunctions, such as spark discharges or short-circuits. Moreover, voltage time curves, but in particular DC or AC voltage, are advantageously settable by the control unit. Furthermore, the maximum transferable amount of energy in case of a malfunction can be limited by the control unit.

In a further possible embodiment, the collection device comprises multiple electrode pairs, which are interconnected to form a matrix or an array, wherein one single or multiple collection containers are provided and wherein at least individual electrode pairs are arranged on the side of the base of the one collection container facing away from the object or on the side of the base of each collection container facing away from the object. Alternatively thereto, the electrode pairs can also be arranged in or on the base of the one collection container or each collection container, respectively. In this manner, a sample collection in multiple vessels can be enabled or the samples can be collected in a location-dependent manner in one large vessel.

An embodiment of the invention furthermore relates to a laser microscope system for dissection or ablation of samples from an object having a microscope having an object holder for accommodating the object and an objective, which defines an optical axis, furthermore having a laser and a laser beam generated by the laser for dissection or ablation of a sample from the object, and having a collection device according to an embodiment of the invention for collecting the dissected or ablated samples, as described above in detail.

Such laser microscope systems are described and known in the prior art, for example, as laser microdissection systems or as laser ablation systems. They can operate in incident light or in transmitted light and use upright or inverse microscopes. In a typical laser microdissection system, the object is illuminated in incident light and the incident light illumination beam path is coupled into the microscope or into the optical axis of the objective. The laser beam cutting the sample is also coupled into the microscope and guided via the microscope objective. Without restricting the generality, this special case is to be presumed for the further illustration of an embodiment of the present invention, without a restriction to such a laser microdissection system thus being linked thereto.

According to an embodiment of the invention, a strongly divergent electric field is generated in such a laser microscope system via the collection device according to an embodiment of the invention in the region of the collection container, i.e., inside the collection container and in the region of its surroundings up to the location of the dissection or ablation. Reference is made to the above statements in conjunction with the collection device according to embodiments of the invention for the advantages resulting therefrom and for further designs.

It is expedient if the object holder is arranged on a microscope table, wherein the microscope table is grounded or nonconductive. This also expediently applies to the object holder itself. In the described special case of the laser microdissection system, the object is typically applied to a membrane, which is in turn seated on a frame-shaped metallic object holder, which is expediently grounded. Alternatively thereto, a slide made of glass can be used, which is then used for ablation or dissection having the object side in the direction of the collection container. The grounding of the mentioned components is expedient to avoid further field divergence in the region of the microscope table or the object holder.

An electrode arrangement has proven to be particularly advantageous in which the outer ring-shaped electrode is grounded and concentrically encloses an inner electrode of small cross section or an electrode tip, wherein the inner electrode is arranged on or close to the optical axis.

In general, the laser microscope system comprises an illumination unit, which generates an illumination beam path and orients it on the object plane of the microscope. This can be an incident light or a transmitted light illumination beam path in this case. If the illumination beam path is oriented from the side of the collection container on the object, the least possible light loss through the electrode arrangement is thus to be ensured. For this purpose, it is advantageous if the outer electrode is formed ring-shaped and has a diameter which is essentially equal to the diameter of the illumination beam path at the location of the outer electrode or is larger than this diameter. The inner electrode is in turn expediently designed as an electrode tip, in particular at the location of the optical axis. In this manner, a strong field divergence is ensured and, on the other hand, the greatest possible amount of light can pass.

Finally, an embodiment of the invention relates to a method for collecting samples dissected or ablated from an object using a collection device according to an embodiment of the invention or using a laser microscope system according to an embodiment of the invention, wherein a sample is dissected or ablated from an object and the dissected or ablated sample is transferred into the collection container of the collection device, wherein the electrode pair of the collection device is arranged on the collection container in such a way that, after application of a voltage to the electrode pair by means of the voltage supply of the collection device, an electric field having a predetermined field divergence is generated in the region of the collection container, so that a dielectric force acts on the dissected or ablated sample, which guides the sample into the interior of the collection container.

The electrode pair is advantageously again arranged on the side of the base of the collection container facing away from the object or on or in the base itself. Multiple collection containers having multiple associated electrode pairs can also be used, wherein in this case multiple voltage supplies can also be provided. With respect to these and further designs, reference is expressly made to the above statements in conjunction with the collection device according to an embodiment of the invention and/or the laser microscope system according to an embodiment of the invention.

In one advantageous design, the strength and/or the profile and/or the divergence of the divergent electric field can be influenced by selection of a suitable collection container. The material of the collection container, but also its shape in particular, play a role for the profile of the divergent electric field in particular, so that the field gradient can be controlled via a particular design of the collection container. This applies similarly for a dielectric medium alternatively or additionally introduced into a region between the electrode pair and the object holder.

Finally, it can be advantageous to coat or print the object or at least the sample to be dissected or ablated using a dielectric material in order to influence the dielectric properties and/or the flight path of the sample into the collection container. This also applies to the case in which the object is applied to a microdissection film. In this case, the expression "object" and/or "sample" is also to comprise the microdissection film in the entire application.

It can furthermore be advantageous to coat and/or print the object or at least the sample to be dissected or ablated with a semiconductor or a conductor before the dissection or ablation of the sample takes place. In this manner, the electric neutrality of the cut-out sample can be ensured.

It is to be emphasized that the advantages and designs described in conjunction with the collection device according to embodiments of the invention and/or with the laser microscope system according to embodiments of the invention apply in a fully analogous manner to the method according to embodiments the invention. For this reason, advantages and designs of the method according to embodiments of the invention are not explained in detail in the present case to avoid repetitions.

It is obvious that the above-mentioned features of embodiments of the present invention and the features still to be explained hereafter are usable not only in the respective specified combination but rather also in other combinations or alone, without leaving the scope of embodiments of the present invention.

FIG. 1 shows, as an example of a laser microscope system, a laser microdissection device 1 having a microscope 30. The microscope table is identified by 2, the microscope objective by 8, the tube by 34. The elements of the laser microdissection device 1 are as follows according to this exemplary embodiment: laser light source 5, which generates a laser beam 6, deflection elements 31 and 32 and a negative lens 19 and a positive lens 18; a movable (double arrow) attenuator 17 for the laser beam, which is typically a filter which reduces the intensity in dependence on the position of the filters; an optical laser focus displacement unit 15 to be discussed hereafter, an aperture unit 36, a laser scanning unit 10, and a further deflection unit 33. Furthermore, a z adjustment unit 4 for the microscope table 2 in order to displace it in the z direction is shown (double arrow).

The main axis or optical axis of the microscope objective 8 is identified by 9. The z direction extends in parallel to the main axis 9. The x-y direction identifies a direction in a plane perpendicular to the main axis 9, which coincides here with the horizontal plane of the microscope table 2 of the microscope 30. The axis of the laser beam propagation is identified by 6a. 13 identifies a laser deflection unit of the laser microdissection device 1. Furthermore, an illumination unit 40 of an incident light illumination having an illumination light source 41 and an illumination optical unit 42 for generating an illumination beam path 43 for illuminating the object imaged by the microscope 30 on the microscope table 2 is shown. For this purpose, the illumination beam path 43 is coupled by means of the deflection element 44 into the optical axis 9 of the microscope objective 8. The object can be observed directly visually and/or by a camera via corresponding interfaces on the tube 34, in particular during the cutting procedure or thereafter.

More specific details on the laser microdissection device 1 shown in FIG. 1 may be inferred from German patent specification DE 100 18 253 C2 of the applicant. In particular, more detailed statements are found therein on the structure and the functionality of the laser scanning unit 10 schematically shown in FIG. 1, which comprises two thick glass wedge plates 11 and 12, which are inclined in relation to the optical axis 14 of the laser beam propagation and are rotatable independently of one another around this axis. The laser beam 6, which is guided through these glass wedge plates 11 and 12, is deflected by a deflection angle α in relation to the optical axis 14. This deflection angle can be set or varied by rotating the wedge plates 11 and/or 12. The thickness and the inclination of the glass wedge plates 11 and 12 is designed in such a way that the center of the objective pupil of the microscope objective 8 is encountered for all deflection angles α. A further advantage of this laser scanning unit 10 is that an x-y scanning table does not have to be used as the microscope table 2, since the microscope table 2 can remain stationary during the cutting procedure. This is because the movement of the laser beam 6 focused by the microscope objective 8 on or in the object 3 (see also FIG. 2) takes place in the x-y direction exclusively by means of the laser scanning unit 10. The aperture unit 36 sets the laser beam aperture suitably. The optical elements of the laser microdissection device 1 shown in FIG. 1 are used to provide the laser beam focus with a suitable diameter and a suitable intensity at the object, which are particularly suitable for the cutting thereof.

The schematically illustrated optical focused displacement unit 15 comprises at least one lens 16 (which is also to include a lens element or lens group) displaceable in the direction of the axis 6a of the laser beam propagation. The corresponding movement is indicated by the double arrow. Such a lens movement is used to move the laser beam focus in the z direction. A relative movement between laser beam focus and object 3 or microscope table 2 can also be achieved by z adjustment of the microscope table 2 via the corresponding z adjustment unit 4.

Figure 2:
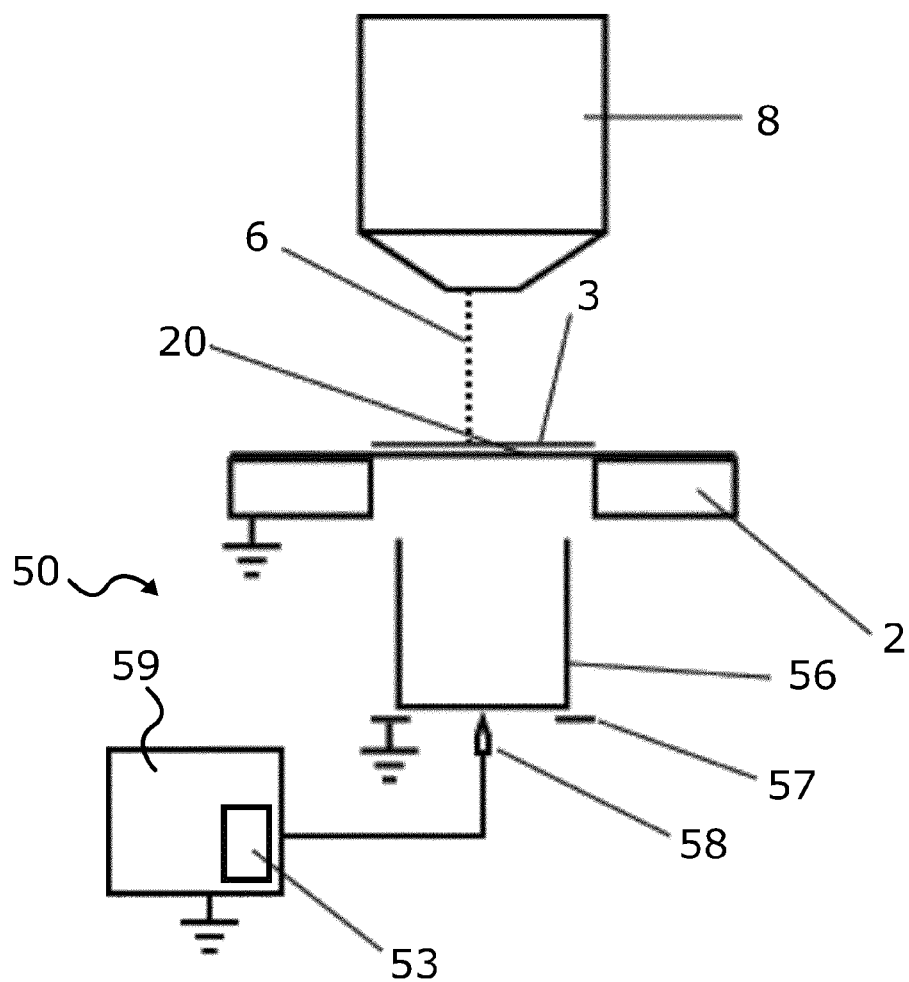

FIG. 2 schematically shows a particularly advantageous embodiment of a collection unit 50 for collecting samples dissected from an object 3, in particular by means of a laser microdissection device 1 according to FIG. 1. Identical reference signs identify identical elements as in FIG. 1.

FIG. 2 schematically shows a collection unit 50 arranged below the microscope table 2. The collection unit 50 comprises a collection container 56 for collecting the dissected samples and an electrode pair 57, 58, which is arranged on the side of the base of the collection container 56 facing away from the object 3, i.e., below the base of the collection container 56. A voltage supply 53 is provided to apply a voltage to the electrodes 57 and 58 of the electrode pair 57, 58.

A sample dissected from the object 3 by means of cutting by the laser beam 6 can be transferred in this manner into the collection container 56 located underneath. The laser beam is generally a UV laser beam of high energy density, which is focused by the objective 8 on the object 3. The object 3 is generally applied to a membrane, which is in turn seated on a metallic object holder 20. Alternatively thereto, an object holder 20 made of glass can be used, wherein the object is then located on the lower side of the slide. It is advantageous if, as shown in FIG. 2, the microscope table 2 is grounded. The microscope table 2 in turn supports the object holder 20, which—if it is metallic—is also grounded.

The electrodes 57 and 58 of the collection device 50 are provided in this exemplary embodiment as a concentrically arranged electrode pair, wherein the inner electrode 58 is formed as an electrode tip and the outer electrode 57 is formed as a ring-shaped electrode. In this exemplary embodiment, the ring-shaped outer electrode 57 is grounded, while a controllable voltage (AC and/or DC) is applied to the inner electrode 58. The voltage supply 53 is provided for this purpose. It is advantageous to set the inner electrode 58 at a high voltage potential between 100 to 10,000 V. The field lines of the strongly divergent electric field bundle at the location of the inner electrode 58, the electrode tip here. This location simultaneously corresponds to the location of the highest field divergence. As a result of this, dissected samples are transferred in the direction of the inner electrode/electrode tip 58, i.e., in the center of the base of the collection container 56.

The voltage supply 53 is a component of a control unit 59, which is suitable, inter alia, for registering malfunctions, such as spark discharges or short-circuits. Moreover, voltage amplitude and voltage time curve are controllable by means of the control unit 59. If the control unit 59 should register a malfunction, the maximum transferable amount of energy can be limited by corresponding setting of voltage amplitude and voltage curve.

The outer electrode 57 is formed ring-shaped (or in the form of a ring disk) in such a way that it lets the light of the condenser of the illumination unit pass unobstructed during an inspection in the case of a transmitted light illumination. In other words, for this purpose the outer ring-shaped electrode 57 is equipped with a light-transmissive inner diameter, which is essentially equal to the diameter of the illumination beam path at the location of the outer electrode 57 or is greater than this. The inner electrode and its supply line, in contrast, has the smallest possible cross section, on the one hand, to ensure strong field divergence and, on the other hand, to let as much light as possible pass from the condenser of a transmitted light illumination unit.

If an AC voltage is applied to the electrodes 57 and 58, the dielectric force can act on the dissected samples completely independently of a possible surface charge of these samples, as is generated in some cases by the procedure of the dissection. Because of the AC voltage, the Coulomb force averages out over time, while the dielectric force is independent of the polarity of the field and is only dependent on the field divergence, however. The application of an AC voltage to the electrode pair 57, 58 is thus particularly expedient in the case of electrostatic samples.

Figure 3:
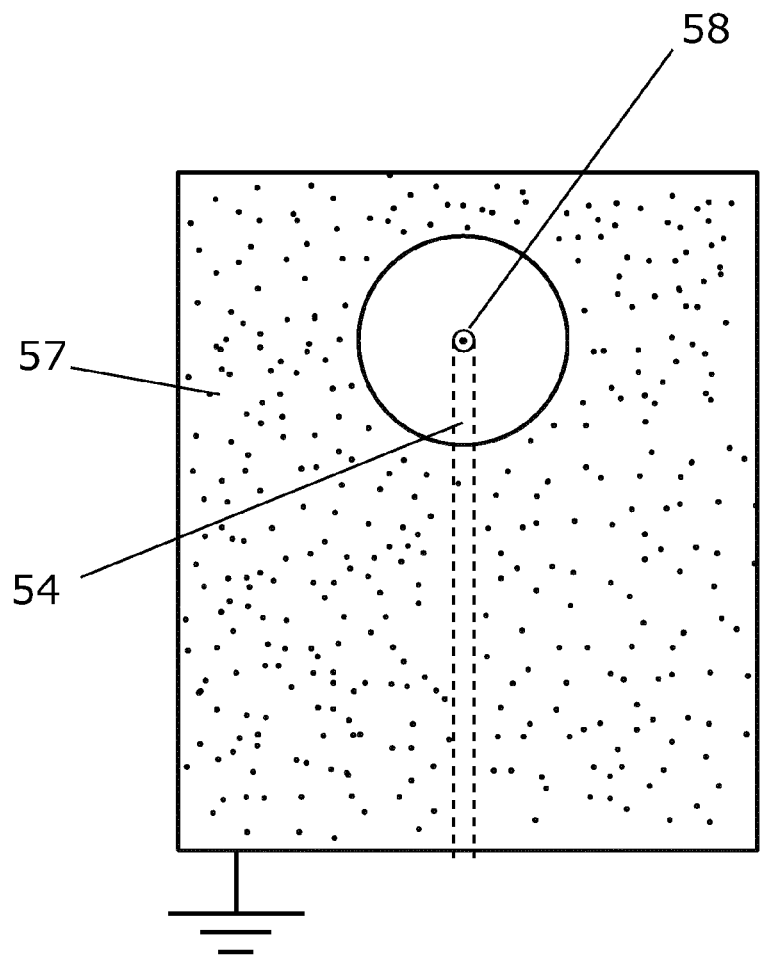

FIG. 3 schematically shows an embodiment of a concentric electrode pair 57, 58 in a top view. The outer (grounded) electrode 57 essentially consists of an electrode plate having a circular cutout, to form the ring-shaped electrode in the meaning of this application. The inner electrode 58, which is embodied essentially as an electrode tip here, is arranged concentrically thereto. Furthermore, the supply line 54 to the inner electrode 58 originating from the voltage supply 53 or the control unit 59 can be seen (cf. FIG. 2).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 laser microdissection device, laser microscope system
2 microscope table
3 object
4 z adjustment unit
5 laser
6 laser beam
6a axis of the laser beam propagation
7 laser beam focus
8 microscope objective
9 main axis or optical axis of the microscope objective
10 laser scanning unit
11 glass wedge plate
12 glass wedge plate
13 laser deflection unit
14 optical axis of the laser unit
15 optical focus displacement unit
16 lens
17 attenuator
18 lens
19 lens
20 object holder
30 microscope
31 deflection element
32 deflection element
33 deflection element
34 tube
36 aperture unit
40 illumination unit
41 illumination light source
42 illumination optical unit
43 illumination beam path
44 deflection element
50 collection device
53 voltage supply
54 supply line
56 collection container
57 outer electrode
58 inner electrode
59 control unit

The invention claimed is:

1. A collection device for collecting a sample dissected or ablated from an object, the collection device comprising:
a collection container configured to collect the dissected or ablated sample;
an electrode pair arranged on a side of a base of the collection container facing away from the object or on or in the base itself, wherein the electrode pair includes an inner electrode and an outer electrode arranged concentrically with respect to each other, and the inner electrode is formed as an electrode tip; and
a voltage supply configured to apply a voltage to the electrodes of the electrode pair such that a divergent electric field is generated at least in a region of the collection container.

2. The collection device as claimed in claim 1, wherein the electrodes of the electrode pair include a ring-shaped outer electrode.

3. The collection device as claimed in claim 1, wherein the voltage supply is configured to apply an alternating current (AC) voltage.

4. The collection device as claimed in claim 1, further comprising a control unit configured to control or regulate the voltage supply with respect to voltage amplitude and/or voltage time curve.

5. The collection device as claimed in claim 1, wherein the voltage supply is configured to apply the voltage in a range from 100 V to 10 kV.

6. The collection device as claimed in claim 1, wherein the voltage supply is configured to apply the voltage to the electrodes of the electrode pair such that the divergent electric field is generated within the collection container and in a region of surroundings of the collection chamber up to a location of the dissection or ablation.

7. The collection device as claimed in claim 1, wherein multiple electrode pairs are interconnected to form an array, of which at least individual electrode pairs are arranged on the side of the base of an individual collection container facing away from the object or in or on the base itself or on the side of the base of each collection container facing away from the object or in or on the respective base itself.

8. A laser microscope system for dissection or ablation of a sample from an object, the laser microscope system comprising:
- a microscope comprising:
- an object holder configured to accommodate the object and an objective, which defines an optical axis;
- a laser configured to generate a laser beam for the dissection or ablation of the sample from the object; and
- a collection device for collecting the sample dissected or ablated from the object, the collection device comprising:
- a collection container arranged to collect the dissected or ablated sample;
- an electrode pair arranged on a side of a base of the collection container facing away from the object or on or in the base itself, wherein the electrode pair includes an inner electrode and an outer electrode arranged concentrically with respect to, and the inner electrode is formed as an electrode tip; and
- a voltage supply configured to apply a voltage to the electrodes of the electrode pair such that a divergent electric field is generated at least in a region of the collection container.

9. The laser microscope system as claimed in claim 8, wherein the object holder is arranged on a microscope table, and wherein the microscope table is grounded or nonconductive.

10. The laser microscope system as claimed in claim 8, wherein the object holder is grounded or nonconductive.

11. The laser microscope system as claimed in claim 8, wherein the electrodes of the electrode pair include an outer electrode which is grounded.

12. The laser microscope system as claimed in claim 11, wherein the electrodes of the electrode pair include an inner electrode at a voltage in a range from 100 V to 10 kV.

13. The laser microscope system as claimed in claim 11, wherein the electrodes of the electrode pair include an inner electrode arranged on or close to the optical axis.

14. The laser microscope system as claimed in claim 8, further comprising an illumination unit configured to generate an illumination beam path and orients the illumination beam path on an object plane of the microscope.

15. The laser microscope system as claimed in claim 14, wherein the electrodes of the electrode pair include an outer ring-shaped electrode having a diameter which is essentially equal to or larger than a diameter of the illumination beam path at a location of the outer electrode.

16. A method for collecting a sample dissected or ablated from an object using a collection device or using a laser microscope system including the collection device, the method comprising:
- dissecting or ablating the sample from the object;
- transferring the dissected or ablated sample into a collection container of the collection device, wherein the collection device includes an electrode pair that is arranged on the collection container in such a way that, after application of a voltage to the electrode pair by a voltage supply of the collection device, an electric field having a predetermined field divergence is generated in a region of the collection container, so that a dielectric force acts on the dissected or ablated sample and guides the sample into an interior of the collection container,
- wherein the electrode pair includes an inner electrode and an outer electrode arranged concentrically with respect to each other, and the inner electrode is formed as an electrode tip.

17. The method as claimed in claim 16, wherein strength and/or profile and/or divergence of the divergent electric field is/are influenced by selection of a suitable collection container and/or a dielectric medium is introduced into a region between the electrode pair and the object holder.

18. The method as claimed in claim 16, wherein the object or at least the sample to be dissected or ablated is coated using a dielectric material or a semiconductor or a conductor before the dissection or ablation of the sample takes place.

* * * * *